United States Patent Office 3,126,084
Patented Mar. 24, 1964

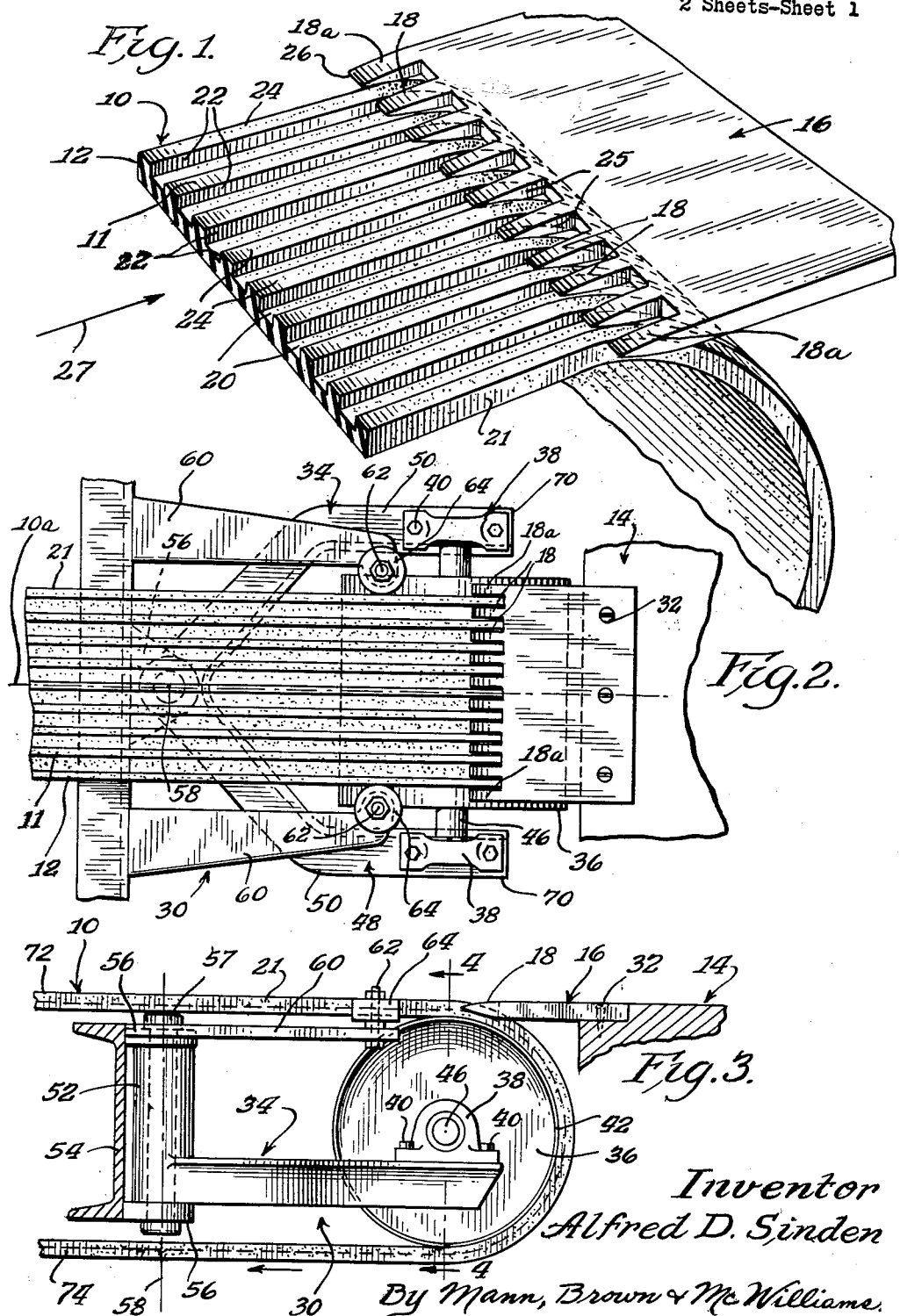

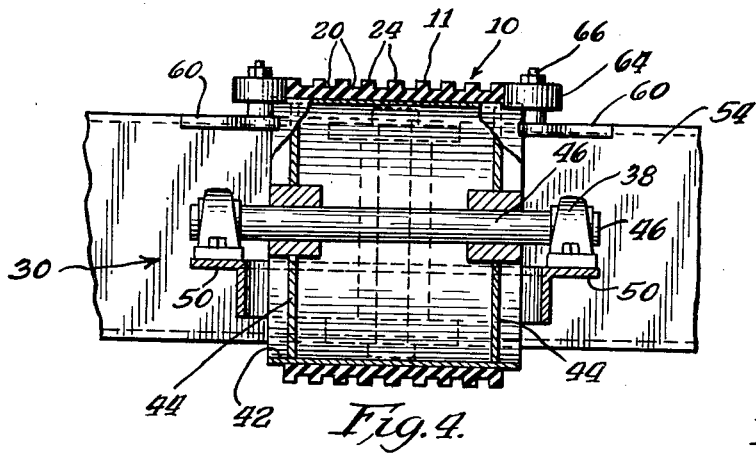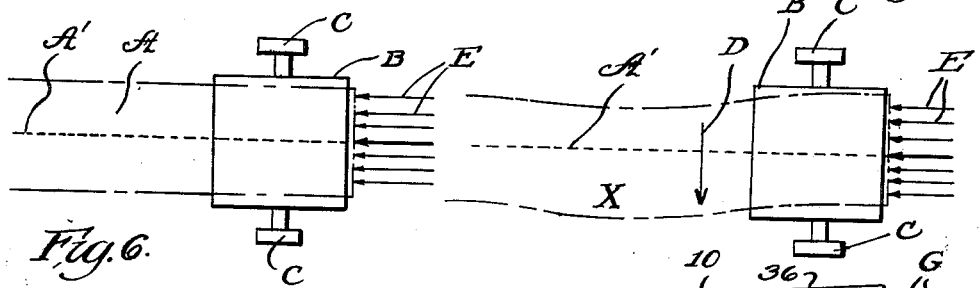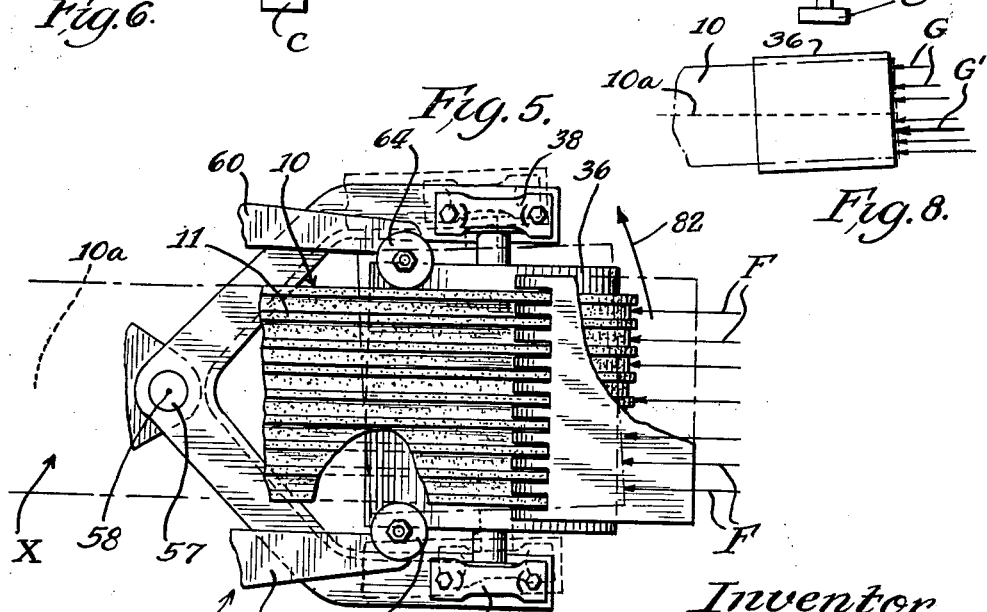

3,126,084
SELF CENTERING END PULLEY ARRANGEMENT
FOR BELT CONVEYORS
Alfred D. Sinden, Aurora, Ill., assignor to Stephens-Adamson Mfg. Co., a corporation of Illinois
Filed July 21, 1960, Ser. No. 44,373
10 Claims. (Cl. 198—16)

My invention relates to a self centering end pulley arrangement for belt conveyors, and more particularly, to a conveying apparatus and method which provides for the substantial elimination of sidewise drift of the conveyor element.

One of the common causes of damage to belt conveyors is the tendency of the conveying member to drift or move sidewise of its pulleys with consequent rubbing or snagging of the belt. As long as a belt remains square with its pulley, drift will not occur. However, when the belt for any reason is disposed out of square with its pulley (due to, for instance, some physical unevenness in the belt carcass or an off center load), relative movement between the belt and pulley will occur, and the sidewise force developed between a belt and pulley is so great that it is impractical to oppose the resulting drift by direct means. To stop sidewise movement of a belt relative to a pulley it is necessary that the movement make some change in the conveyor setup that will reverse the tendency to drift. While a crown on a pulley provides such a means in that it acts to steer a belt back to center once it has drifted to one side, the centering effect of a crown is very slight when the belt is near center, and therefore it will not prevent a moderate amount of belt wandering from side to side in the normal running of a belt conveyor.

The running of a belt on an end pulley will be found to be very sensitive to angular misalignment of the pulley in the plane of the belt. Thus, the correct position of the pulley axis is at right angles to the centerline of the conveyor; if the axis is swung ever so slightly away from this position, a belt running on the pulley will immediately drift toward the side which has been brought closer to the opposite end of the conveyor, that is, toward the side which tends to make the belt looser. This result is very much like winding a cord on a spool, since the cord will wind straight on the spool so long as it is maintained at right angles to the spool, but as soon as this angular relationship between the cord and the spool changes, the cord will wind angularly across the rim of the spool.

The influence of shaft misalignment on drift is so pronounced that any practical amount of pulley crowning is unable to counteract even a relatively slight angular swinging of the pulley axis.

My invention has to do with an arrangement in which the belt is held by direct means against any sidewise wandering, and in which one or both of the conveyor end pulleys, as distinguished from an intermediate supporting or bend pulley, is mounted so that any relative sidewise movement between the belt and pulley, due to temporary belt misalignment, is taken up by swinging of the pulley rather than by sidewise wandering of the belt. Moreover, the pulley mounting is such that the swinging of the pulley toward either side places it in a position in which it will increasingly oppose further swing.

A principal object of this invention is to provide an end pulley arrangement for conveyors of the endless ribbon belt type wherein wandering of the belt at conveyor ends is eliminated by direct means while requiring only slight pressure against any portion of the belt.

Another important object of the invention is to provide a positive acting or self centering end pulley arrangement that is particularly adapted for use in connection with conveyor belts of the type which have grooved load supporting surfaces that are to cooperate with comb plates or members at the conveyor ends, whereby the comb plate or member may be fixed in its operative position with respect to the belt, and the belt is not only physically restrained against lateral movement with respect thereto, but also the cause of drift tendencies is effectively counteracted.

Other objects of the invention are to provide a conveyor belt end pulley arrangement which may be applied to either or both ends of the conveyor, which may be associated either with an idler end pulley or a driving end pulley, which is equally effective regardless of the direction of the conveyor is to run, which is composed of few and simple parts, and which is economical of manufacture, convenient to install, and may be readily applied to existing equipment.

Other objects, uses and advantages will be obvious or become apparent from a consideration of the following detailed description and the application drawings.

In the drawings:

FIGURE 1 is a diagrammatic perspective view illustrating one end portion of a form of conveyor that is especially adapted for use in applying the principles of my invention;

FIGURE 2 is a plan view of an end pulley arrangement in accordance with my invention as applied to the conveyor components shown in FIGURE 1;

FIGURE 3 is a side elevational view of the structure shown in FIGURE 2;

FIGURE 4 is a diagrammatic cross-sectional view along line 4—4 of FIGURE 3;

FIGURE 5 is a diagrammatic plan view of my end pulley arrangement, illustrating the operation thereof in opposing drift of the conveyor;

FIGURES 6 and 7 are diagrams in plan illustrating certain basic principles of the conveyor belt art; and FIGURE 8 is a showing of the pulley of FIGURE 5 in its dashed line position, in diagram form on a reduced scale.

Reference numeral 10 of FIGURES 1 and 2 generally indicates a passenger conveyor belt of the grooved load supporting surface 11 type, in connection with which the results achieved by the practice of my invention are of the greatest benefit. Conveyor belt 10 is in the form of an endless ribbon type conveying element 12, which is customarily trained over pulleys to define a moving sidewalk that extends between appropriate stationary passenger platforms, for instance, platform 14 of FIGURE 2. Belts of the type represented by the illustrated belt 10 at either end are conventionally associated with a fixed comb plate structure 16 that includes projections 18 which extend into the grooves 20 of the belt, and at the unloading platform this insures that foreign matter such as passenger's clothing or heels will not be carried around the end pulley of the conveyor.

As already mentioned, endless conveyors have a known tendency to drift sidewise during operation of the conveyor apparatus and many efforts have been made to oppose this tendency to drift, with varying degrees of success. Drift may be caused either by minor irregularities in the belting or unevenness in loading, both of which are difficult to control, and as already mentioned, drift is the result of the belting getting out of square with any particular pulley in question.

This may be best understood by referring to the diagrams of FIGURES 6 and 7, which are provided solely to make clear the factors that cause drift. So long as belt A remains square with pulley B (which may be assumed to be an end pulley journalled in bearings C), drift of belt A laterally of conveyor centerline A' will not occur. However, if belt A is provided with an off center load, as at X in FIGURE 7, the weight of the load tends to throw the belt A out of square with pulley B, with the result that the belt will drift in the direction of arrow D of FIGURE 7 (assuming that belt A is laterally unconfined).

The sidewise force developed between the belt A and the pulley B is similar to that developed when turning on a screw a nut that is held against lateral movement, but the force magnitudes experienced in the conveyor art are such that it has been impractical heretofore to oppose the sidewise movement of a belt A directly.

Conventionally, this drift action has been opposed by employing either the aforementioned crowned pulley and/or self training bend pulleys intermediate the ends of the conveyor that automatically shift in response to drift tendencies to direct the belt back to its proper running position. As a matter of fact, self training pulley arrangements require the drift actually occur before they become effective to oppose drift. However, it may be assumed that any conveyor apparatus employing endless conveying elements such as belting will tend to drift or wander sidewise at least to some extent even where conventional training devices are used, since the latter are not sensitive enough to completely control drift.

This tendency to drift presents a particularly acute problem in connection with belts of the type shown in FIGURE 1, as any sidewise movement of belt 10, if permitted, will bring the sides 22 of the ridges 24 that define grooves 20 against the sides 25 of the comb plate projections 18, with the result that there will be an objectionable rubbing and gouging action on the belting material. Of course, the pointed ends 26 of the comb plate structure projections aggravate this problem when the belt moves in the direction of the arrow 27 of FIGURE 1.

In accordance with this invention, the tendency of the belt 10 to drift sidewise is completely overcome by employing the positive belt centering means and end pulley arrangement or device generally indicated at 30 in FIGURES 2–5. In employing device 30, the belt 10 may be trained over pulleys in the usual manner, except that the end pulleys of the apparatus are arranged as indicated. Comb plate structure 16 is fixed, as may be found in some common forms of escalator arrangements, to the passenger platform 14, as by appropriate flat headed screws 32 or by welding.

For purposes of this description, the end pulley arrangement or device 30 is considered applied to the loading and unloading ends of the conveyor, and since both ends are identical for purposes of this disclosure, only the unloading end is illustrated.

The end pulley arrangement or device 30 comprises a pivoting or swinging support frame 34, on which end pulley 36 is journalled in any suitable manner, as by being received in suitable ball bearing pillow block units 38, which are affixed to the frame 34 as by employing appropriate bolts 40.

The end pulley 36 may be of any suitable type, that shown comprising a steel cylinder 42 (see FIGURE 4) having fixed in either end thereof discs 44 which are keyed in any suitable manner to pulley shaft 46. The pulley 36 per se may be considered conventional and as a matter of fact any conventional form of pulley will serve the purpose.

Frame 34 as illustrated is in the form of a V-shaped member 48 comprising angled arms 50, having the angle cross-sectional configuration shown in FIGURE 4, fixed in any suitable manner to clevis member 52 which is thus at the apex of frame 34. Frame 34 and the end pulley it carries are pivotally secured to a fixed framing member, such as channel member 54, which has applied thereto, in alignment with the longitudinal center 10a of the apparatus, spaced lugs 56 between which clevis member 52 is applied. Bolt 57 pivotally secures the frame 34 to lugs 56 and, as indicated at FIGURE 2, the pivot axis 58 provided by bolt 57 should be in alignment with the longitudinal center 10a of the apparatus. It will also be noted that said pivotal axis is spaced inwardly of the conveyor with respect to the passenger platform 14 and thus is disposed between the axes of rotation of the conveyor end pulleys 36.

The end pulley arrangement or device 30 in the form illustrated also includes a pair of guide arms 60 having journalled in any suitable manner at their ends, as by pins 62, rollers 64 that engage the side edges 21 of belt 10. The guide arms 60 are fixed to the support member 54, as by welding, and it is to be understood that member 54 is fixed to the supporting framework of the conveyor apparatus or some other suitable base structure so that it remains stationary and fixed with respect to passenger platform 14.

It will thus be seen that frame 34 defines a bifurcated swingable support for pulley 36 including the parallel projections 70 between which the pulley is journalled.

Additionally, the comb plate projections 18 are preferably proportioned to fit within belt grooves 20 with relative close tolerances and may slidably engage groove walls 22 where the belt edges and width are made uniform. Thus, if the guide rollers 64 were not employed, the comb plate structure would exert a guiding action on the longitudinal movement of the conveyor belt. The comb plate structure illustrated includes projections 18a that engage the belt side edges, but they are not essential to the proper functioning of the invention, and may be omitted.

As indicated in FIGURE 3, the end pulley pivotal support for device 30 in the form illustrated is disposed between the upper and lower runs 72 and 74 of the belt 10, but for purposes of this invention, it could be disposed below the lower run by appropriately shaping frame 34 to correctly position pulley 36 with respect to belt 10.

In operation, the belt 10 is operated in the usual manner through a suitable form of drive pulley arrangement, which may or may not be located at the ends of the conveyor. If it is desired that end pulley 36 be the drive pulley, the drive for same could be carried by frame 34, as will be obvious to those skilled in the art.

During movement of the belt 10, the rollers 64 engage the side edges 21 of the belt and physically restrain it from lateral movement. If the belt is made perfectly uniform along its length and off center loads are avoided, the belt will run square with pulley 36 and there will be no relative lateral movement between the two.

However, conventional manufacturing tolerances make avoidance of belt irregularities unlikely, and off center loads on passenger belt conveyors cannot be reasonably controlled. Since either of these conditions will tend to dispose the belt out of square with pulley 36, drift tendencies are bound to be encountered during normal operation of belt 10.

In accordance with the present invention, when a drift tendency occurs in the belt, due to an irregularity in the shape of the portion of the belt passing over pulley 36, or due to an off center loading, the belt 10 does not move but applies a reaction force to the pulley 36 which acts to dispose the pulley in a position to oppose the tendency to drift.

For instance, assuming that the belt 10 carries an off center load where indicated at X in FIGURE 5, the off center load has a tendency to cause relative movement between the belt and the pulley, laterally of conveyor centerline 10a, for the reasons outlined in connection with FIGURE 7, and for the further reason that rollers 64 do not eliminate the change in shape in the belt that is effected by the off center loading. However, the belt is physically held against movement laterally of centerline 10a and thus the tendency of the belt to go out of square with pulley 36, due to the off center load X, swings pulley 36 about the axis of bolt 57 in the direction of arrow 82, as indicated by the exaggerated dashed line showing of FIGURE 5. This disposes the pulley in a position to counteract the change of shape made in the belt by the off center load and restores the necessary square relation between the belt and pulley 36.

The swinging of pulley 36 changes the distribution of the forces applied to the pulley 36 by belt 10 from the even distribution indicated by arrows F of FIGURE 5 to the uneven distribution indicated by arrows G of FIGURE 8, which results in the resultant of these forces, indicated by arrow G', acting in a direction out of alignment with the axis 58 of bolt 57 and the centerline 10a of the conveyor. This creates a moment acting on frame 34 which restores the pulley 36 to its normal operating position.

Looking at the interaction of the various components of the arrangement in another way, any shape irregularity in the belt, caused by off center loading or other drift tendency source, and the physical restraint applied to the belt by rollers 64, causes the belt to apply a reaction force to the pulley 36 in the direction opposite to the direction of drift tendency, and this swings the end pulley and its frame 34 in the direction required to dispose the pulley in a position that makes the belt tighter at the side toward which the drift tendency is directed; such positioning of the end pulley causes a tendency to drift in the opposite direction which latter tendency is sufficiently strong to restore the end pulley and belt to their normal squared relationship.

On actual practice (assuming that the customary manufacturing tolerances are employed), movement of pulley 36 is barely perceptible, as the forces that the belt applies to the pulley are substantially in the proportion required to prevent the pulley from swinging more than a minute amount before the drift tendency is completely counteracted.

When drift tendency is in the direction opposite to that indicated in FIGURE 5, the operation of the invention will be the same but in reverse, as will now be obvious. Also, the action is the same regardless of the direction of rotation of the pulley, and thus regardless of the direction of movement of the belt. It should be noted that the positioning of the pulley for training purposes is achieved without the use of belt engaging guides, other than the belt end pulley, carried by frame 34, and as a matter of fact, the use of such guides would render device 30 inoperative since they would oppose the swinging of pully 36 in the direction necessary for the invention to perform its function.

Applicant has found that guide arms 60 and rollers 64 may be eliminated if so desired as the guiding action of the comb plate projections will provide the holding action necessary, but it is preferable to use them to prevent belt and comb plate wear.

The end pulley arrangement of this invention may be applied with facility to conveyor apparatus having the customary smooth load supporting surface, as will be obvious to those skilled in the art, in which case the comb plate member 16 would be eliminated. However, the maximum benefits of the invention are realized when an arrangement of the type indicated in FIGURES 2–5 is employed in connection with a grooved conveyor belt 10, since movement of the belt in the area of the comb plate structure 16 is effectively prevented. This is because the end pulley itself, which is positioned immediately under the comb plate structure 16, is trained with respect to the belt rather than reliance being placed on a training arrangement located between the two end pulleys.

It will be apparent that my invention has a striking signficance in connection with the form of belt shown in FIGURE 1 since ordinarily there can be only about 1/16 inch permissible lateral movement of the belt with respect to the comb member before gouging of the belt occurs (as where the customary manufacturing tolerances are employed). When my invention is practiced, all sidewise movement can be eliminated.

The comb plate structure 16 illustrated is intended to represent the well known one or more piece type comb-like members that are associated with conveyors of the type illustrated, as well as escalators and the like. And, of course, the invention is just as applicable to material handling conveyors as it is to passenger conveyor apparatus.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. In conveyor apparatus of the type including an endless type conveyor element trained over spaced end pulleys, the improvement wherein one of the end pulleys is journalled on a frame that is mounted with freedom of movement pivotally about a vertical axis aligned with the longitudinal center of the apparatus and that is positioned inwardly of said one end pulley, and including fixed guide means acting on said conveyor element adjacent said one pulley for preventing lateral movement of said element.

2. In conveyor apparatus of the type including an endless ribbon type conveyor element trained over spaced end pulleys, a device therefor for maintaining one of the end pulleys in centered relation with respect to said element, said device comprising a support on which said one end pulley is journalled, a fixed pivot support structure mounted adjacent said one end pulley, a pivot assembly connecting said support and said support structure and defining a vertical pivotal axis that is disposed in alignment with the longitudinal center of the apparatus and between the axes of rotation of said end pulleys, said support being free from conveyor element engaging devices other than said one pulley, and guide means for positively holding said conveyor element from lateral drift.

3. The device set forth in claim 2 wherein said guide means comprises guide rollers engaging the edges of said conveyor element, said guide rollers being journalled on stationary support elements.

4. The device set forth in claim 3 wherein the conveyor element has a grooved load supporting surface, and wherein said guide means comprises a comb member positioned adjacent the load supporting surface of said conveyor element, said comb member being stationary with respect to said element and said support and including projections that are received in at least some of the grooves of said conveyor element, said projections being proportioned to fit into said some grooves with relatively close tolerances.

5. Conveyor apparatus comprising an endless ribbon type conveyor element, spaced end pulleys over which said element is trained, a pivoting frame on which one of said end pulleys is journalled, said frame being pivoted so as to be free for swinging movement about a pivotal axis that extends crosswise of the axis of rotation of said one end pulley and that is positioned in alignment with the longitudinal center of said apparatus, said pivotal axis being disposed adjacent said one pulley and between the axes of rotation of said pulleys, and guide means engaging said conveyor element for holding said conveyor element against lateral movement, whereby, when said conveyor element is subjected to an off center load tending to cause the element to drift in one direction laterally of the apparatus, said one end pulley under the reaction forces applied thereto by said off center load will tend to be swung in the direction opposite to the direction of drift about said pivotal axis for positioning said one pulley to oppose drift.

6. The apparatus set forth in claim 5 wherein said guide means comprises guide rollers engaging the edges of said conveyor element adjacent said one end pulley, said guide rollers being journalled on stationary supports.

7. The apparatus set forth in claim 5 wherein the conveyor element has a grooved surface, and wherein said guide means comprises a fixed comb member positioned adjacent said grooved surface of said conveyor element, said comb member including projections that are received in at least some of the grooves of said conveyor element, said projections being proportioned to fit into said some grooves with relatively close tolerances.

8. Passenger conveyor apparatus comprising spaced passenger platforms having comb members carried thereby, an endless ribbon type conveyor element extending between said comb members, spaced end pulleys, each at one end of said conveyor element, over which said conveyor element is trained, said conveyor element having a grooved load supporting surface and said comb members each including projections that are received in at least some of the grooves of said conveyor element, one of said end pulleys being journalled on a frame mounted with freedom for swinging movement about a vertical pivotal axis that extends crosswise of the axis of rotation of said one end pulley and that is positioned in alignment with the longitudinal center of said apparatus, said pivotal axis being disposed adjacent said one pulley and between the axes of rotation of said pulleys, with the comb member adjacent said one end pulley having its said projections proportioned to slidingly engage within said some grooves, and guide rollers engaging the edges of said conveyor element adjacent said one end pulley, said guide rollers being journalled on fixed supports that are stationary with respect to said platforms.

9. In conveyor apparatus of the type including an endless conveyor member trained over spaced end pulleys, the improvement wherein one of the end pulleys is mounted with freedom for pivotal movement about a substantially vertical axis substantially aligned with the longitudinal center of the conveyor apparatus and disposed inwardly of the axis of rotation of said one end pulley with respect to the conveyor member, and fixed guide means engaging the conveyor member adjacent said one pulley for restraining movement of the member laterally thereof, whereby tendencies of the conveyor member to move laterally are eliminated without employing belt engaging guide means between said one pulley and one of the runs of the conveyor member for positioning said one pulley to oppose said lateral movement after same has occurred.

10. An end pulley arrangement for endless conveyors comprising a rotatably mounted end pulley over which the conveyor is trained, fixed guide means engaging the endless conveyor adjacent said end pulley for restraining movement of said conveyor laterally thereof, and means mounting said end pulley with freedom for swinging movement about a vertical axis substantially aligned with the longitudinal axis of the conveyor and disposed inwardly of the axis of rotation of said end pulley, thereby causing the pulley to tend to swing inwardly at one end in response to increased tension of the conveyor at said end, whereby wandering of the conveyor upon the imposition of off center loads is prevented.

References Cited in the file of this patent

UNITED STATES PATENTS

| | | |
|---|---|---|
| 1,432,832 | Brockett | Oct. 24, 1922 |
| 2,160,057 | Carus et al. | May 30, 1939 |
| 2,521,071 | Lister et al. | Sept. 5, 1950 |
| 2,535,501 | Loughridge | Dec. 26, 1950 |
| 2,725,757 | Murphy | Dec. 6, 1955 |
| 2,916,139 | Murphy | Dec. 8, 1959 |

FOREIGN PATENTS

| | | |
|---|---|---|
| 798,211 | France | Mar. 2, 1936 |